United States Patent Office 3,326,775

Patented June 20, 1967

1

3,326,775

METHOD FOR THE PRODUCTION OF L-GLUTAMIC ACID

Guido M. Miescher, Terre Haute, Ind., assignor to Commercial Solvents Corporation, New York, N.Y., a corporation of Maryland No Drawing. Filed Apr. 24, 1961, Ser. No. 104,820
9 Claims. (Cl. 195—47)

My invention relates to a method of producing L-glutamic acid, more particularly it relates to a method for the production of L-glutamic acid by the fermentation of nutrient fermentation media containing certain unsaturated fatty acids with L-glutamic acid producing strains of *Brevibacterium divaricatum.*

Previously, glutamic acid has been successfully prepared by fermentation utilizing the organism *Brevibacterium divaricatum.* However, this organism produces L-glutamic acid in low yields when a fermentation medium containing only a carbohydrate source, a nitrogen source, a phosphate source, and a potassium source is utilized. Even the addition of trace amounts of mineral salts such as $FeSO_4$ and $MnSO_4$ serve to raise the yields only slightly. Therefore, in order to obtain the product in satisfactory yields, it has previously been found necessary to add a source of biotin to the fermentation medium, such as casate, peptone, corn stoop liquor, beet extract, yeast extract, bran extract, etc., or pure biotin.

I have now discovered a process whereby L-glutamic acid can be produced in a fermentation medium consisting of a suitable carbohydrate source, a suitable nitrogen source, a suitable phosphate source, and a suitable potassium source without the inclusion of any of the aforementioned biotin-containing materials.

My new process not only is economical and efficient but allows full utilization of L-glutamic acid-producing strains of the organism *Brevibacterium divaricatum* such as NRRL B–2311 and NRRL B–2312 which have been deposited with the Northern Utilization Research and Development Division of the United States Department of Agriculture. My new process is also advantageous because of the facility with which the glutamic acid-producing organisms can be removed from the fermentation medium upon completion of the fermentation. This, of course, is a great advantage in the recovery of glutamic acid. My new process, therefore, represents an improvement over previous methods for the production of L-glutamic acid by fermentation using the above-mentioned organism by allowing the use of easily obtainable and economical materials in the fermentation medium.

My new process for the production of L-glutamic acid comprises incubating the organism *Brevibacterium divaricatum* in an aqueous nutrient medium, the said medium containing small amounts of oleic acid, linoleic acid, linolenic acid, or the water soluble salts of these acids, or mixtures thereof. The fermentation is preferably carried out at temperatures ranging from about 28 to about 31° C. under submerged conditions of agitation and aeration. Carbohydrates useful in nutrient media for production of L-glutamic acid by my new process include such materials as glucose and fructose, or crude sugar-containing materials such as materials prepared by hydrolizing starch-containing materials, molasses, etc. In addition to a carbohydrate, nutrient media utilized also require the presence of a nitrogen source in either organic or inorganic form such as urea, ammonium salts such as ammonium chloride, ammonium sulfate, ammonium tartrate, etc. Also, a source of potassium and phosphorus such as dipotassium phosphate is required for suitable yields are as trace minerals containing such minerals as manganese, magnesium, iron, etc., in compounds such as magneisum sulfate, ferrous sulfate, manganese sulfate, etc.

2

I have found that satisfactory yields of L-glutamic acid can be obtained using oleic, linoleic, and linolenic acids or the water soluble salts of these acids, or mixtures thereof in amounts from about .01% to about 0.1% by volume of fermentation medium. I prefer to use about .03% of the unsaturated fatty acid by volume of fermentation medium.

In order to have the unsaturated fatty acid available to the organisms of the fermentation, I have found it advantageous to use an emulsifier. Any suitable emulsifier can be employed such as, for example, the mineral oil or commercial emulsifiers such as Tween emulsifiers, which are polyoxyethylene sorbitol fatty acid esters. If no emulsifier is used, the unsaturated fatty acid has the tendency to plate out on the surface of the fermentation container and is therefore not available to the fermentation organism.

In carrying out the process of my invention, I prefer to maintain the fermentation medium at a pH ranging from about 6 to about 9 during the entire fermentation, which ordinarily is completed within two to three days' time when conducted under aerated conditions.

After preparation of L-glutamic acid by fermentation of the organism *Brevibacterium divaricatum* according to my above-described process, I can recover the L-glutamic acid by any suitable means. One such means of recovery involves removing the cells from the fermentation medium by filtration or centrifugation, condensing the resulting filtrate, adjusting the pH of the said filtrate to about 3.2 by addition of acid and crystallizing the glutamic acid at reduced temperatures. I have found that when my process is followed, the steps of filtration or centrifugation are much more easily executed. Much less filter aid is needed to accomplish filtration and the filtration is very rapid when my process is employed. Also, centrifugation is very easily accomplished when my process is employed because the cells of the organism tend to settle out and not remain in suspension. If a product of a higher grade of purity is desired, the condensed filtrate can first be subjected to ion-exchange resin treatment in order to remove other impurities before crystallization. After adsorption on the ion-exchange resin, the L-glutamic acid can then be eluted therefrom and again condensed and crystallized at reduced temperature and recovered by centrifugation.

Besides using pure unsaturated fatty acids in my new process, I can also use natural or synthetic substances which contain sufficient amounts of the fatty acids or their salts as described in my process. Substances such as most oils of vegetable or animal origin, or antifoams, emulsifiers, etc., made thereof, contain significant amounts of the fatty acids described in my invention and, therefore, can be used as a source of the unsaturated fatty acid in production of L-glutamic acid by the organism *Brevibacterium divaricatum.*

It is understood that the examples given below are for the purpose of illustration only, and I do not intend to be limited to specific ingredients or amounts thereof or to the other specific operating conditions other than previously broadly set forth herein.

*Example I*

A basal medium was prepared containing by volume 10% glucose, 0.8% urea, 0.1% $K_2HPO_4$, 0.05% $MgSO_4 \cdot 7H_2O$, 2 p.p.m. $FeSO_4$, and 2 p.p.m. $MnSO_4$. The pH of the medium was adjusted to 7.5 with $NH_4OH$. Several fermentations were carried out in 500 ml. flasks in which was placed 30 ml. of the basal medium plus the test variant and the flasks then inoculated with *Brevibacterium divaricatum* NRRL B-2312. Urea was incrementally added to maintain the pH in the range of between 7.0 and 8.0. A temperature of 30° C. was maintained throughout the incubation and the flasks were agitated by a rotary action shaker for 50 hours. The results of the fermentations are shown in Table I.

TABLE I

| | Cell weight, milligrams/ gram medium | Grams glutamic acid/liter medium |
|---|---|---|
| Basal only | 0.2 | 0 |
| Basal + oleic acid (in mineral oil):* | | |
| 0.01% | 3.0 | 23 |
| 0.03% | 7.8 | 35 |
| 0.1% | 11.4 | 4 |
| Basal + linoleic acid (in mineral oil):* | | |
| 0.05% | 7.5 | 38 |
| Basal + linolenic acid (in mineral oil):* | | |
| 0.05% | 8.8 | 27 |
| Basal + sodium oleate: 0.06% | 7.8 | 22 |

*The fatty acids were mixed with mineral oil to obtain a 10% fatty acid solution.

*Example II*

The process of Example I was carried out using *Brevibacterium divaricatum* NRRL B-2311 instead of *Brevibacterium divaricatum* NRRL B-2312. Results similar to those of Example I were obtained.

Now having described my invention, what I claim is:

1. In a process for the production of L-glutamic acid by cultivating the L-glutamic acid-producing strains of the organism *Brevibacterium divaricatum* in an aqueous nutrient medium, the improvement which comprises carrying out the fermentation in the presence of a compound selected from the group consisting of oleic acid, linoleic acid, linolenic acid, water soluble salts thereof, substances containing said acids, and mixtures thereof, in an amount from about 0.01% to about 0.1% by volume of fermentation medium.

2. The process of claim 1 wherein the unsaturated fatty acids are in the form of water soluble salts.

3. The process of claim 1 wherein the strain of the *Brevibacterium divaricatum* is NRRL B-2311.

4. The process of claim 1 wherein the strain of the *Brevibacterium divaricatum* is NRRL B-2312.

5. The process of claim 1 wherein the amount of oleic acid is 0.03% by volume of fermentation medium.

6. The process of claim 1 wherein the amount of linoleic acid is 0.03% by volume of fermentation medium.

7. The process of claim 1 wherein the amount of linolenic acid is 0.03% by volume of fermentation medium.

8. A process for the production of glutamic acid which comprises cultivating L-glutamic acid-producing strains of the organism *Brevibacterium divaricatum* in an aqueous nutrient medium containing a carbohydrate source, a phosphate source, a potassium source, a nitrogen source, a trace mineral source, and a compound selected from the group consisting of oleic acid, linoleic acid, linolenic acid, water soluble salts thereof, substances containing said acids, and mixtures thereof in the amounts from about 0.01% to about 0.1% by volume of fermentation medium.

9. In a process for the production of L-glutamic acid by cultivating the L-glutamic acid-producing strains of the organism *Brevibacterium divaricatum* in an aqueous nutrient medium, the improvement of a method for substantially improving the yield of L-glutamic acid which consists of carrying out the fermentation in the presence of a compound selected from the group consisting of oleic acid, lineleic acid, linolenic acid, water soluble salts thereof, substances containing said acids, and mixtures thereof in an amount from about 0.01% to about 0.1% by volume of fermentation medium.

References Cited

UNITED STATES PATENTS

| | | | |
|---|---|---|---|
| 2,890,989 | 6/1959 | Anderson | 195—78 |
| 2,978,383 | 4/1961 | Yamada | 195—47 |
| 2,978,384 | 4/1961 | Yamada | 195—47 |
| 3,002,889 | 10/1961 | Kinoshita et al. | 195—47 |
| 3,013,947 | 12/1961 | Bessell et al. | 195—101 |

OTHER REFERENCES

Chem. et al., Hakko Kogaku Zasshi 37, 295–324 (1959), abstracted in Chemical Abstracts 54 (1960).

Journal of Biological Chemistry, vol. 166 (1946), pages 335–343.

A. LOUIS MONACELL, *Primary Examiner.*

T. E. LEVOW, ART WINKELSTEIN, L. M. SHAPIRO, *Assistant Examiners.*